US012224673B2

(12) United States Patent
Trainer et al.

(10) Patent No.: US 12,224,673 B2
(45) Date of Patent: Feb. 11, 2025

(54) ELECTRICAL POWER SYSTEM (71) Applicant: ROLLS-ROYCE plc, London (GB)

(72) Inventors: David R. Trainer, Derby (GB); Francisco Javier Chivite Zabalza, Stafford (GB); Mark Sweet, Chesterfield (GB); Luke George, Derby (GB)

(73) Assignee: ROLLS-ROYCE plc, London (GB)

( * ) Notice: Subject to any disclaimer, the term of this patent is extended or adjusted under 35 U.S.C. 154(b) by 266 days.

(21) Appl. No.: 17/956,968

(22) Filed: Sep. 30, 2022

(65) Prior Publication Data
US 2023/0134788 A1 May 4, 2023

(30) Foreign Application Priority Data

Oct. 28, 2021 (GB) ...................... 2115515

(51) Int. Cl.
H02M 3/335 (2006.01)
B64D 27/24 (2006.01)
H02M 1/00 (2006.01)
H02M 1/32 (2007.01)

(52) U.S. Cl.
CPC ........ H02M 3/33576 (2013.01); B64D 27/24 (2013.01); H02M 1/0009 (2021.05); H02M 1/325 (2021.05); H02M 3/33573 (2021.05)

(58) Field of Classification Search
CPC ............. H02M 3/335; H02M 3/33573; H02M 3/33592; H02M 1/32; H02M 1/0064; H02M 1/0009; H02M 1/325
See application file for complete search history.

(56) References Cited

U.S. PATENT DOCUMENTS

| 9,667,157 | B1* | 5/2017 | Dong .................. H03K 17/166 |
| 9,929,663 | B1 | 3/2018 | Babazadeh et al. |
| 11,209,507 | B2* | 12/2021 | Gu ..................... G01R 33/3664 |
| 11,312,503 | B1* | 4/2022 | Said ....................... B64D 41/00 |
| 11,888,403 | B2* | 1/2024 | Smith ............... H02M 3/33592 |

(Continued)

FOREIGN PATENT DOCUMENTS

GB 2523552 A 9/2015

OTHER PUBLICATIONS

Mar. 27, 2023 Search Report issued in European Patent Application No. 22198316.6.

(Continued)

*Primary Examiner* — Adolf D Berhane
(74) *Attorney, Agent, or Firm* — Oliff PLC (57) ABSTRACT

There is provided an electrical power system comprising: a DC voltage source, a DC electrical network, a DC to AC to DC converter having a primary side connected to the DC voltage source and a secondary side connected to the DC electrical network, and a controller configured to control the DC to AC to DC converter, wherein the controller is configured to: monitor an electrical current or voltage between the DC voltage source and the DC electrical network; determine, based on the monitored electrical current or voltage, whether the DC electrical network is in a fault condition; and increase a switching frequency of the primary side of the DC to AC to DC converter in response to a positive determination that the DC electrical network is in a fault condition.

20 Claims, 3 Drawing Sheets

(56) References Cited

U.S. PATENT DOCUMENTS

2011/0292688 A1  12/2011  Zhang et al.
2023/0387816 A1* 11/2023  Mallik ................ H02M 1/0064

OTHER PUBLICATIONS

Yang B. et al.; "Over Current Protection Methods for LLC Resonant Converter"; Eighteenth Annual IEEE Applied Power Electronics Conference and Exposition; vol. 2; Feb. 2, 2003; pp. 605-609.
Ramakrishnan H.; "Bidirectional, Dual Active Bridge Reference Design for Level 3 Electric Vehicle Charging Stations"; Texas Instruments; Design Guide: TIDA-010054; Jun. 30, 2019; pp. 1-86.
Apr. 11, 2022 Search Report issued in United Kingdom Patent Appliction No. GB2115515.5.

* cited by examiner

ELECTRICAL POWER SYSTEM

CROSS-REFERENCE TO RELATED APPLICATIONS

This specification is based upon and claims the benefit of priority from United Kingdom Patent Application No. 2115515.5, filed on 28 Oct. 2021, the entire contents of which are incorporated herein by reference.

FIELD OF THE DISCLOSURE

The present disclosure relates to an electrical power system. The present disclosure also relates to a method of operating an electrical power system and a controller for controlling a DC to AC to DC converter.

BACKGROUND

The use of an Energy Storage System (ESS) is becoming an important part of advanced electrical power systems for aerospace, marine and automotive applications. The ESS typically employs a bulk energy storage medium such as a high-density battery which is connected through a DC to AC to DC power electronic converter to a DC electrical network. The DC to AC to DC converter provides a regulation function and allows the voltage at the terminals of the battery to change as it discharges its stored energy whilst maintaining a near-constant direct voltage at the electrical network it is supplying.

The ESS is generally used intermittently to provide high power for short periods of time such as for engine starting, rotating generator load-levelling (e.g., supplying load peak demands only) or during emergency conditions such as loss of a rotating generator.

The ESS is characterised by its very high energy storage capacity and very low source impedance meaning faults which present an effective short-circuit across the battery terminals can lead to a very high rate of change of current and extremely high peak current typically reaching thousands of Amperes.

In the case of a low impedance fault within the DC network, the first line of defence is to turn off all transistors that can extinguish the fault current before it rises beyond the capabilities of the semiconductors. If this fails, the back-up protection is commonly provided by a fuse which eventually blows, but in most cases this leads to destruction of the semiconductors and other converter components.

It is therefore desirable to provide other means for mitigating faults in such an electrical power system.

SUMMARY

According to a first aspect there is provided an electrical power system comprising: a DC voltage source, a DC electrical network, a DC to AC to DC converter having a primary side connected to the DC voltage source and a secondary side connected to the DC electrical network, and a controller configured to control the DC to AC to DC converter, wherein:
the controller is configured to:
monitor an electrical current or voltage between the DC voltage source and the DC electrical network;
determine, based on the monitored electrical current or voltage, whether the DC electrical network is in a fault condition; and
increase a switching frequency of the primary side of the DC to AC to DC converter in response to a positive determination that the DC electrical network is in a fault condition.

The DC to AC to DC converter may be a single-phase converter or a multiple-phase converter. The DC voltage source may comprise a battery, a fuel cell, a supercapacitor and/or a DC capacitor.

It may be that controller is further configured to modify (e.g., decrease) a duty cycle of the primary side of the DC to AC to DC converter in response to a positive determination that the DC electrical network is in the fault condition.

It may also be that the primary side of the DC to AC to DC converter comprises a plurality of transistors, and wherein each of the plurality of transistors comprises Silicon Carbide or Gallium Nitride.

Further, it may be that the controller is configured to increase the switching frequency of the primary side of the DC to AC to DC converter by a factor of at least 5 in response to a positive determination that the DC electrical network is in the fault condition. The controller may be configured to increase the switching frequency of the primary side of the DC to AC to DC converter by a factor of between 5 and 10 in response to a positive determination that the DC electrical network is in the fault condition.

The controller may be configured to increase the switching frequency of the primary side of the DC to AC to DC converter to at least 50 kHz in response to a positive determination that the DC electrical network is in the fault condition.

It may be that the DC to AC to DC converter comprises a transformer. The transformer may have a leakage reactance of greater than 0.1 per-unit. The leakage reactance may preferably be greater than 0.2 per-unit. The leakage reactance may be more preferably greater than 0.3 per-unit.

It may be that the DC to AC to DC converter comprises a transformer with a non-magnetic core. The transformer may be an air-cored transformer. The transformer may have a high per-unit reactance.

It may be that the electrical power system further comprises an external inductor connected in series to a primary winding of the primary side of the DC to AC to DC converter and/or a secondary winding of the secondary side of the DC to AC to DC converter.

According to a second aspect, there is provided an aircraft power and propulsion system comprising the electrical power system in accordance with the first aspect.

According to a third aspect, there is provided an aircraft comprising an electrical power system in accordance with the first aspect or an aircraft power and propulsion system in accordance with the second aspect.

According to a fourth aspect, there is provided a method of operating an electrical power system comprising a DC voltage source, a DC electrical network, and a DC to AC to DC converter having a primary side connected to the DC voltage source and a secondary side connected to the DC electrical network; the method comprising:
monitoring an electrical current or voltage between the DC voltage source and the DC electrical network;
determining, based on the monitored electrical current or voltage, whether the DC electrical network is in a fault condition;
increasing a switching frequency of the primary side of the DC to AC to DC converter in response to a positive determination that the DC electrical network is in a fault condition.

The method may further comprise modifying (e.g. decreasing) a duty cycle of the primary side of the DC to AC to DC converter in response to a positive determination that the DC electrical network is in the fault condition.

It may be that the switching frequency of the primary side of the DC to AC to DC converter is increased by a factor of between 5 to 10 in response to a positive determination that the DC electrical network is in the fault condition.

It may also be that the switching frequency of the primary side of the DC to AC to DC converter is increased to at least 50 kHz in response to a positive determination that the DC electrical network is in the fault condition.

According to a fifth aspect, there is provided a controller for controlling a DC to AC to DC converter in an electrical power system, wherein the controller is configured to:

monitor an electrical current or voltage between a DC voltage source and a DC electrical network of the electrical power system;

determine, based on the monitored electrical current or voltage, whether the DC electrical network is in a fault condition; and increase a switching frequency of a primary side of the DC to AC to DC converter in response to a positive determination that the DC electrical network is in a fault condition.

It may be that the controller is further configured to modify (e.g., decrease) a duty cycle of the primary side of the DC to AC to DC converter in response to a positive determination that the DC electrical network is in the fault condition.

The controller may be configured to increase the switching frequency of the primary side of the DC to AC to DC converter by a factor of between 5 to 10 in response to a positive determination that the DC electrical network is in the fault condition.

The controller may be configured to increase the switching frequency of the primary side of the DC to AC to DC converter to at least 50 kHz in response to a positive determination that the DC electrical network is in the fault condition.

The controller of any of the above aspects may be implemented as a single controller or multiple separate (e.g., distributed) controllers. Thus, the controller may be or may form part of a control system. The controller may be implemented in software, hardware or a combination of the two. The controller may be or may be a functional module of an Engine Electronic Controller (EEC) or a Full Authority Digital Engine Controller (FADEC).

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
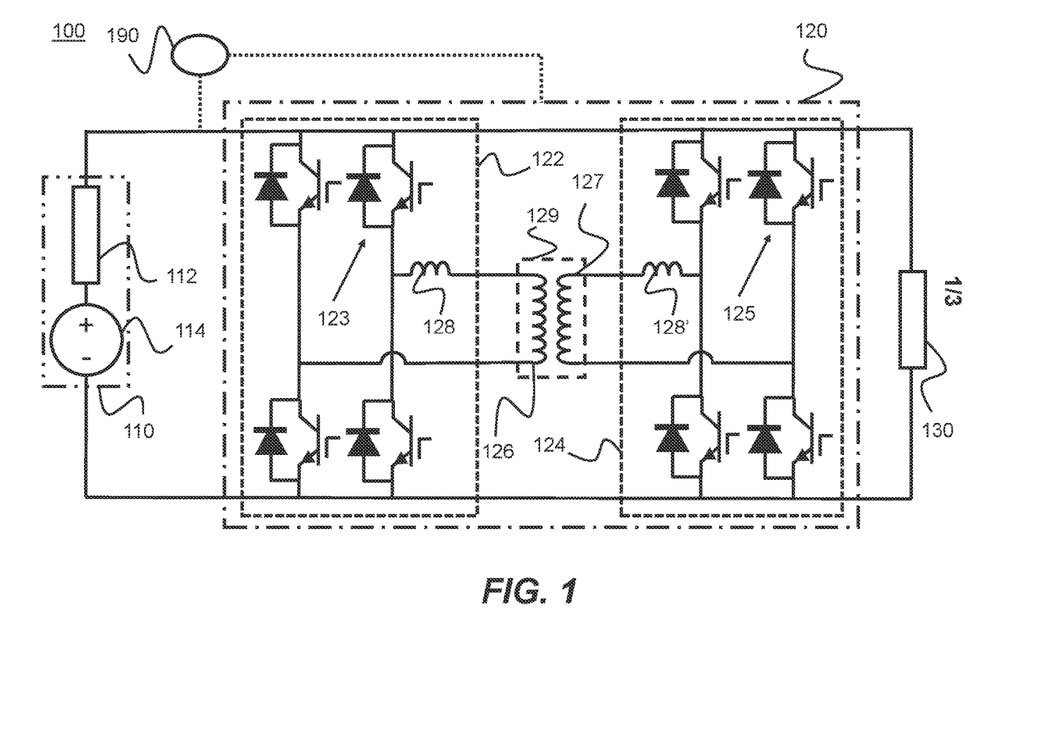
FIG. 1 is a circuit diagram which shows an example electrical power system.

FIG. 1 shows a first example electrical power system 100 comprising a DC voltage source 110, a DC electrical network 130, a DC to AC to DC converter 120 and a controller 190. The DC to AC to DC converter 120 has a primary side 122 connected to the DC voltage source 110 and a secondary side 124 connected to the DC electrical load network 130. The controller 190 is configured to control the DC to AC to DC converter 120. In the example of FIG. 1, the DC electrical network is represented by a load 130, an internal impedance of the DC voltage source 110 is represented by a resistor 112 and an electrical energy delivery capacity of the DC voltage source is represented by an ideal voltage source 114. The DC voltage source 110 may comprise, for example, a battery, a supercapacitor and/or a DC capacitor.

In the example shown in FIG. 1, the primary side 122 of the DC to AC to DC converter 120 comprises a plurality of primary transistors 123. Likewise, the secondary side 124 of the DC to AC to DC converter comprises a plurality of secondary transistors 125. Each of the transistors 124, 125 may be provided with an anti-parallel diode which may be a separate semiconductor or an internal body diode. The transistors 124, 125 may be operated in a "synchronous rectification" mode where the transistor conducts in its reverse direction to support the anti-parallel diode conduction. Alternatively, the transistors 124, 125 may only conduct in their forward directions, with the anti-parallel diodes handling conduction in their forward directions for half of each AC cycle.

In addition, the DC to AC to DC converter 120 comprises a transformer 129 connected between the primary side 122 and the secondary side 124. The transformer 129 comprises a primary winding 126 connected to the primary side 122 and a secondary winding 127 connected to the secondary side 124. It will be appreciated that each side of the DC to AC to DC converter 120 may comprise additional components, such as inductors or capacitors so as to provide a resonant/soft switching circuit.

In use, the primary side 122 receives an input DC voltage from the DC voltage source 110 and provides an input AC voltage to the transformer 129. A frequency of the input AC voltage is dependent on a switching frequency of the primary side 122. A root mean square of the input AC voltage is dependent on a duty cycle of the primary side 122. Further, the transformer 129 receives the input AC voltage from the primary side 122 and provides an output AC voltage to the secondary side 124. The secondary side 124 receives the output AC voltage from the transformer 129 and provides an output DC voltage to the DC electrical network 130. A switching frequency of the secondary side 124 is dependent on a frequency of the output AC voltage. A duty cycle of the secondary side is dependent on a root mean square of the output AC voltage. The frequency of the output AC voltage is approximately equal to the frequency of the input AC voltage. While the DC to AC to DC converter 120 is shown as being a single-phase converter in the example of FIG. 1, it will be appreciated that in other examples the DC to AC to DC converter 120 may be a multiple-phase (e.g., 3-phase) converter. Other converter topologies, including multilevel topologies, may be used.

In a fault condition, a fault in the electrical power system 100 may lead to a magnitude of an electric current passing between the DC voltage source 110 and the DC electrical network 130 becoming extremely large in a very short period of time. For example, if the internal impedance 112 of the DC voltage source 110 is very low and the electrical energy delivery capacity 114 of the DC voltage source 110 is very high, a fault in the electrical power system 100 which originates in the DC electrical network 130 and which presents an effective short circuit across the secondary side 124 of the DC to AC to DC converter 120 may cause a magnitude of a fault current to be conducted through the electrical power system 100 which reaches an order of thousands of Amperes within a very short period of time. This may be because the magnitude of the fault current is only limited by the internal impedance 112 of the DC voltage source 110.

If the magnitude of the fault current were not limited, the magnitude of the fault current could rise beyond a tolerance limit of the power electronics converter 120 and/or a component of the DC electrical network 130. The tolerance limit of the power electronics converter 120 may be associated with a switching capacity of at least one of the plurality of primary transistors 123 or at least one of the plurality of secondary transistors 125.

The controller 190 is configured to monitor an electrical current passing between the DC voltage source 110 and the DC electrical network 130. The controller 190 may monitor the electrical current being conducted through the electrical power system 100 between the DC voltage source 110 and the DC electrical network 130 using a current sensor. The current sensor may comprise, for example, a Hall effect sensor, a fibre optic current sensor and/or a fluxgate sensor. The controller 190 is also configured to determine whether the DC electrical network 130 is in a fault condition based on the monitored electrical current. The controller 190 is configured to make a positive determination to the effect that the DC electrical network is in the fault condition when the monitored electrical current is indicative of a presence of a fault current which is caused by a fault in the DC electrical network 130. In other examples, the controller 190 may monitor the voltage at the DC electrical network using a suitable voltage sensor in order to identify a fault condition. For example, if the controller 190 identifies that the voltage has collapsed beyond a threshold value (e.g., 50%), then it may be determined that a fault is present.

As described above, the controller 190 is configured to control the DC to AC to DC converter 120. In normal use, the controller 190 controls the switching frequency and the duty cycle of the primary side 122 and the secondary side 124. The controller 190 controls the DC to AC to DC controller 120 by providing a plurality of pulse-width modulation (PWM) control signals to each of the primary side 122 and the secondary side 124, each PWM control signal having a frequency and a duty cycle.

Each of the plurality of PWM control signals provided to the primary side 122 controls a switching frequency and a duty cycle of a respective transistor of the plurality of primary transistors 123. Likewise, each of the plurality of PWM control signals provided to the secondary side 124 controls a switching frequency and a duty cycle of a respective transistor of the plurality of secondary transistors 125. Accordingly, the controller 190 is configured to control the switching frequency and the duty cycle of the primary side 122 and the secondary side 124 by controlling the frequency and the duty cycle of each PWM control signal provided to the primary side 122 and the secondary side 124, respectively.

The controller 190 is configured to increase the switching frequency of the primary side 122 of the DC to AC to DC converter 120 in response to a positive determination that the DC electrical network 130 is in the fault condition. The controller 190 increases the switching frequency of the primary side 122 of the DC to AC to DC converter 120 by increasing the frequency of each of the plurality of PWM control signals provided to the primary side 122. However, when the DC electrical network 130 is in the fault condition, the plurality of secondary transistors 125 (or their anti-parallel diodes) are forced into conduction as a consequence of the effective short circuit across the secondary side 124 of the DC to AC to DC converter 120. Accordingly, the controller 190 is not able to effectively control the operation of the secondary side 124 in the fault condition of the DC electrical network 130.

In some examples, the controller 190 is further configured to modify the duty cycle of the primary side 122 of the DC to AC to DC converter 120 in response to a positive determination that the DC electrical network 130 is in the fault condition. The controller 190 modifying the duty cycle of the primary side 122 of the DC to AC to DC converter 120 by modifying the duty cycle of each of the plurality of PWM control signals provided to the primary side 122.

An impedance of the transformer 129 is dependent on a resistance of the transformer 129 and a reactance of the transformer 129. The reactance of the transformer 129 is dependent on, among other things, a reactance of the primary winding 126 of the transformer 129 and a reactance of the secondary winding 127 of the transformer 129. In turn, the reactance of the primary winding 126 is related to a product of a self-inductance of the primary winding 126 and a frequency of the input AC voltage supplied to the transformer 129 by the primary side 122. Consequently, as the frequency of the input AC voltage supplied to the transformer 129 increases, so does the impedance of the transformer 129. The switching frequency of the primary side 122 of the DC to AC to DC converter 120 defines the frequency of the input AC voltage supplied to the transformer 129 by the primary side 122. As a result, as the controller 190 increases the switching frequency of the primary side 122, the reactance of the transformer 129 increases, which therefore brings about an increase in the reactance of the transformer 129.

The magnitude of the electric current passing between the DC voltage source 110 and the DC electrical network 130 is moderated by the impedance of the transformer 129 in accordance with Ohm's law. More specifically, a ratio of the AC input voltage to the impedance of the primary winding 126 dictates a magnitude of an electric current passing through the primary winding 126, which in turn moderates the magnitude of the electric current passing between the DC voltage source 110 and the DC electrical network 130.

In other words, if the impedance of the transformer 129 is increased, the magnitude of the electric current passing between the DC voltage source 110 and the DC electrical network 130 will decrease if the root mean square of the AC input voltage is held constant. Conversely, if the root mean square of the AC input voltage is decreased, the magnitude of the electric current passing between the DC voltage source 110 and the DC electrical network 130 will decrease if the impedance of the transformer 129 is held constant. If the impedance of the transformer 129 is increased and the root mean square of the AC input voltage is decreased, the magnitude of the electric current passing between the DC voltage source and the electrical network 130 will decrease further.

As a result, the increase in switching frequency of the primary side 122 of the DC to AC to DC converter 120 effected by the controller 190 in response to a determination that the DC electrical network 130 is in a fault condition has the effect of limiting the magnitude of a fault current without requiring the interruption of the fault current. In examples in which the controller is further configured to decrease the duty cycle of the primary side 122 in response to a positive determination that the DC electrical network is in a fault condition, the effect of limiting the magnitude of the fault current is further enhanced. Alternatively, if the increase in the switching frequency provides sufficient limitation of the fault current, the controller may not modify the duty cycle or may use the modification of the duty cycle to provide finer control of the current (e.g., by selectively decreasing or increasing the duty cycle according to requirements).

Accordingly, the configuration of the electrical power system 100 allows the DC voltage source 110 to be used in the fault condition to inject a limited current to a fault site within the DC electrical network 130. This may enable a protection mechanism within the DC electrical network 130 to be safely triggered. In particular, the configuration of the electrical power system 100 enables a DC voltage source 110 having a very low internal impedance 112 and a very high electrical energy delivery capacity 114 to be safely used to provide the limited current to the fault site. In addition, the electrical power system 100 is provided with means for limiting a fault current without a need to provide additional hardware components.

If the magnitude of the fault current is extremely large, the controller 190 may be required to increase the switching frequency of the primary side 122 significantly in order to cause a sufficient increase in the impedance of the transformer 129, which in turn is able to adequately limit the fault current. However, a maximum switching frequency of the primary side 122 is limited by a maximum switching speed of each of the primary plurality of transistors 123.

In additional examples, each of the plurality of primary transistors 123 comprises an advanced semiconductor material such as Silicon Carbide (SiC) or Gallium Nitride (GaN). The maximum switching speed of a transistor comprising a Silicon Carbide or a Gallium Nitride based semiconductor material may be significantly higher than conventional semiconductor materials. Consequently, in such additional examples, the maximum switching frequency of the primary side 122 may be significantly increased. It follows that the controller 190 is able to increase the switching frequency of the primary side 122 more significantly, and therefore is able to more effectively limit a fault current having an extremely large magnitude in the fault condition of the DC electrical network.

Particularly with such advanced semiconductor materials, the controller 190 is able to significantly increase the switching frequency of the primary side 122 of the DC to AC to DC converter 120 by a factor of 5-10. For example, where the frequency of the input AC voltage is typically 10 kHz during normal use, this may be increased to 50-100 kHz during the fault condition. This provides a marked increase in the impedance of the transformer 129 which in turn provides more effective limitation of the fault current in the fault condition 120.

As described above, the reactance of the primary winding 126 is related to a product of a self-inductance of the primary winding 126 and a frequency of the input AC voltage supplied to the transformer 129 by the primary side 122. The self-inductance of the primary winding 126 is a result of an inherent leakage inductance of the transformer 129. The inherent leakage inductance is a consequence of imperfect magnetic coupling within the transformer 129, which arises as a consequence of an internal geometry of the transformer 129. In further examples of the electrical power system 100, the internal geometry of the transformer 129 may be specified so as to increase the inherent leakage inductance of the transformer 129. Accordingly, the increase in the frequency of the input AC voltage supplied to the transformer 129 by the primary side 122 in the fault condition leads to a larger increase in the reactance of the primary winding 126. Therefore, in such examples, the ability of the controller 190 to limit the fault current in the fault condition of the DC electrical network 130 is further increased.

It is usual to select a transformer with a low leakage reactance, for example a leakage reactance of the order 0.1 per unit (such that, for 1.0 per unit current, about 10% of the voltage across the transformer is lost) or even lower. However, as explained above, it may be desirable to select a transformer with a higher-than-normal leakage reactance to enhance the fault current limiting effect. For example, a transformer with a leakage reactance of above 0.1 per unit, above 0.2 per unit or even above 0.3 per unit may be selected. This increase can be achieved through suitable selection of transformer geometry, as will be understood by those skilled in the art. Additionally or alternatively, a transformer with a non-magnetic core (e.g., an air-cored transformer) may be used to achieve a higher per unit leakage reactance.

In the example of FIG. 1, a first external inductor 128 is connected in series with the primary winding 126 of the transformer 129 and a second external inductor 128' is connected in series with the secondary winding 127 of the transformer 129. It will be appreciated that in other examples of the electrical power system 100, only the first external inductor 128 or the second external inductor 128' are provided, or it may be that neither the first external inductor 128 nor the second external inductor 128' are provided. The provision of the first external inductor 128 and/or the second external inductor 128' increases an effective inductance of the transformer 129 as part of the DC to AC to DC converter 120, and thereby increases the impedance of the transformer 129 independently of the frequency of the input AC voltage supplied to the transformer 129. Thus, an increase in the frequency of the input AC voltage supplied to the transformer 129 by the primary side 122 in the fault condition leads to an even larger increase in the impedance of the transformer 129. Therefore, the inclusion of the first external inductor 128 and/or the second external inductor 128' may provide even more effective limitation of the fault current in the fault condition of the DC electrical network 130.

Figure 2:
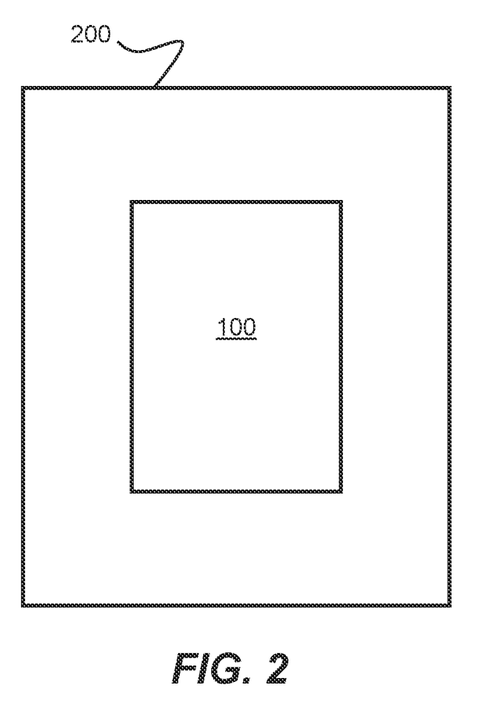
FIG. 2 shows an example aircraft power and propulsion system comprising an example electrical power system.

FIG. 2 shows an example aircraft power and propulsion system 200 comprising an electrical power system 100. The electrical power system 100 may be in accordance with any of examples of the electrical power system 100 described above and/or with respect to FIG. 1.

Figure 3:
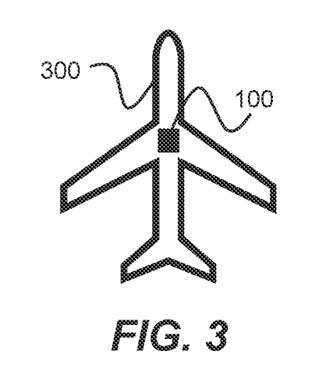
FIG. 3 shows an aircraft comprising the example electrical power system of FIG. 1.

FIG. 3 shows an aircraft 300 comprising an electrical power system 100. The electrical power system 100 may be in accordance with any of examples of the electrical power system 100 described above and/or with respect to FIG. 1 or the aircraft power and propulsion system 200 of FIG. 2.

Figure 4:
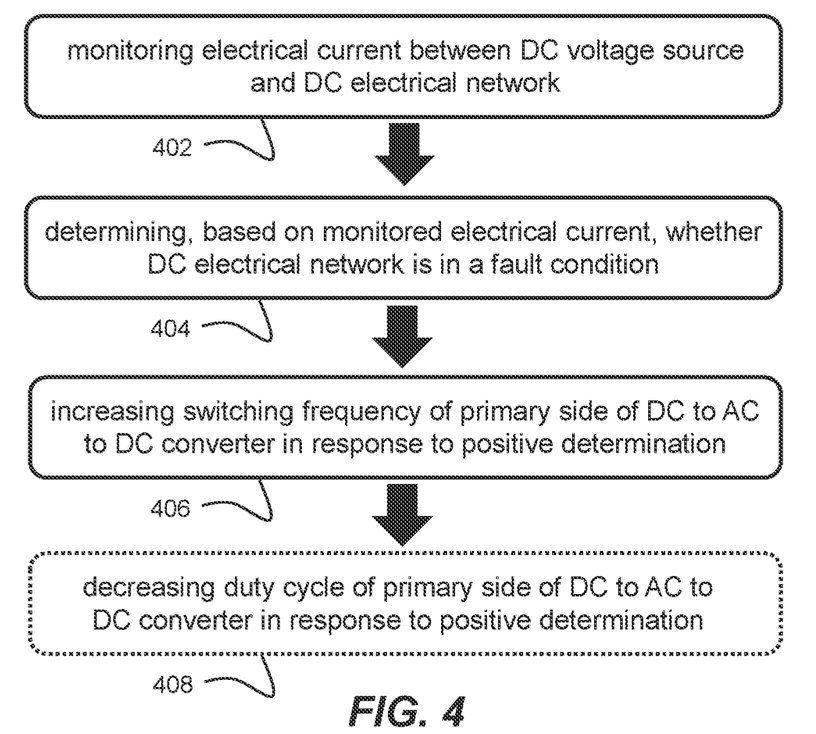
FIG. 4 is a flowchart which shows an example method of operating an electrical power system.

FIG. 4 shows a flowchart of a method 400 of operating an electrical power system. The electrical power system may be in accordance with any of examples of the electrical power system 100 described above and/or with respect to FIG. 1. The electrical power system therefore comprises a DC voltage source, a DC electrical network, and a DC to AC to DC converter having a primary side connected to the DC voltage source and a secondary side connected to the DC electrical network.

The method 400 begins at block 402, which includes monitoring an electrical current passing between the DC voltage source and the DC electrical network. The electrical current may be monitored, for instance, using a controller operatively connected to a current sensor. The sensor may comprise, for example, a Hall effect sensor, a fibre optic current sensor and/or a fluxgate sensor.

The method 400 proceeds to block 404, which comprises determining, based on the monitored electrical current, whether the DC electrical network is in a fault condition. In block 404, a positive determination to the effect that the DC electrical network is in the fault condition is made when the monitored electrical current is indicative of a presence of a fault current which is caused by a fault in the DC electrical network. The determination may be made using a controller or a processor. If no positive determination to the effect that the DC electrical network is in the fault condition is made in block 404, the following method blocks are not executed.

The method 400 further includes block 406, comprising increasing a switching frequency of the primary side of the DC to AC to DC converter in response to a positive determination that the DC electrical network is in a fault condition. In some examples, the primary side of the DC to AC to DC converter comprises a plurality of transistors, and wherein at least one of the plurality of transistors comprises Silicon Carbide or Gallium Nitride. In which case, it may be that block 406 comprises increasing the switching frequency of the primary side of the DC to AC to DC converter so as to produce an input AC voltage on the primary side of the DC to AC to DC converter having a frequency of at least 50 kHz in response to a positive determination that the DC electrical network is in the fault condition.

Optionally, the method further includes block 408. Block 408 comprises modifying (e.g. decreasing) a duty cycle of the primary side of the DC to AC to DC converter in response to a positive determination that the DC electrical network is in the fault condition.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electrical power system comprising:
a DC voltage source;
a DC electrical network;
a DC to AC to DC converter comprising:
a transformer;
a primary side comprising a plurality of first transistors and a first inductor connected between the DC voltage source and a primary winding of the transformer, the first inductor being connected in series with the primary winding; and
a secondary side comprising a plurality of second transistors and a second inductor connected between the DC electrical network and a secondary winding of the transformer, the second inductor being connected in series with the secondary winding; and a controller configured to control the DC to AC to DC converter, and being further configured to:
monitor an electrical current or voltage between the DC voltage source and the DC electrical network;
determine, based on the monitored electrical current or voltage, whether the DC electrical network is in a fault condition; and
increase a switching frequency of the primary side of the DC to AC to DC converter in response to a positive determination that the DC electrical network is in a fault condition.

2. The electrical power system of claim 1, wherein the controller is further configured to modify a duty cycle of the primary side of the DC to AC to DC converter in response to a positive determination that the DC electrical network is in the fault condition.

3. The electrical power system of claim 1, wherein each of the plurality of first transistors and the plurality of second transistors comprises Silicon Carbide or Gallium Nitride.

4. The electrical power system according to claim 1, wherein the controller is configured to increase the switching frequency of the primary side of the DC to AC to DC converter by a factor of at least 5 in response to a positive determination that the DC electrical network is in the fault condition.

5. The electrical power system according to claim 1, wherein the controller is configured to increase the switching frequency of the primary side of the DC to AC to DC converter to at least 50 kHz in response to a positive determination that the DC electrical network is in the fault condition.

6. The electrical power system according to claim 1, wherein the transformer has a leakage reactance of greater than 0.1 per-unit.

7. The electrical power system according to claim 1, wherein the transformer has a leakage reactance of greater than 0.2 per-unit.

8. The electrical power system according to claim 1, wherein the transformer has a leakage reactance of greater than 0.3 per-unit.

9. The electrical power system according to claim 1, wherein the transformer has a non-magnetic core.

10. The electrical power system according to claim 1, further comprising an external inductor connected in series to the primary winding and/or the secondary winding.

11. An aircraft power and propulsion system comprising the electrical power system of claim 1.

12. An aircraft comprising the electrical power system of claim 1.

13. A method of operating an electrical power system comprising a DC voltage source, a DC electrical network, and a DC to AC to DC converter comprising a transformer; a primary side comprising a plurality of first transistors and a first inductor connected between the DC voltage source and a primary winding of the transformer, the first inductor being connected in series with the primary winding; and a secondary side comprising a plurality of second transistors and a second inductor connected between the DC electrical network and a secondary winding of the transformer, the second inductor being connected in series with the secondary winding; the method comprising:
monitoring an electrical current or voltage between the DC voltage source and the DC electrical network;
determining, based on the monitored electrical current or voltage, whether the DC electrical network is in a fault condition;

increasing a switching frequency of the primary side of the DC to AC to DC converter in response to a positive determination that the DC electrical network is in a fault condition.

14. The method of claim 13, further comprising:
modifying a duty cycle of the primary side of the DC to AC to DC converter in response to a positive determination that the DC electrical network is in the fault condition.

15. The method of claim 13, wherein the switching frequency of the primary side of the DC to AC to DC converter is increased by a factor of between 5 to 10 in response to a positive determination that the DC electrical network is in the fault condition.

16. The method of any of claim 13, wherein the switching frequency of the primary side of the DC to AC to DC converter is increased to at least 50 kHz in response to a positive determination that the DC electrical network is in the fault condition.

17. A controller for controlling a DC to AC to DC converter in an electrical power system that includes a DC voltage source; a DC electrical network; and a DC to AC to DC converter comprising: a transformer; a primary side comprising a plurality of first transistors and a first inductor connected between the DC voltage source and a primary winding of the transformer, the first inductor being connected in series with the primary winding; and a secondary side comprising a plurality of second transistors and a second inductor connected between the DC electrical network and a secondary winding of the transformer, the second inductor being connected in series with the secondary winding, wherein the controller is configured to:
monitor an electrical current or voltage between the DC voltage source and the DC electrical network of the electrical power system;
determine, based on the monitored electrical current or voltage, whether the DC electrical network is in a fault condition; and
increase a switching frequency of the primary side of the DC to AC to DC converter in response to a positive determination that the DC electrical network is in a fault condition.

18. The controller of claim 17, wherein the controller is further configured to modify a duty cycle of the primary side of the DC to AC to DC converter in response to a positive determination that the DC electrical network is in the fault condition.

19. The controller of claim 17, wherein the controller is configured to increase the switching frequency of the primary side of the DC to AC to DC converter by a factor of at least 5 in response to a positive determination that the DC electrical network is in the fault condition.

20. The controller of claim 17, wherein the controller is configured to increase the switching frequency of the primary side of the DC to AC to DC converter to at least 50 kHz in response to a positive determination that the DC electrical network is in the fault condition.

* * * * *